O. K. FARR.

Shovel-Plow.

No. 11,454

Patented Aug. 1, 1854.

UNITED STATES PATENT OFFICE.

CHARLES K. FARR, OF AUBURN, MISSISSIPPI.

IMPROVEMENT IN CULTIVATORS.

Specification forming part of Letters Patent No. 11,454, dated August 1, 1854.

*To all whom it may concern:*

Be it known that I, C. K. FARR, of Auburn, in the county of Hinds and State of Mississippi, have invented a new and useful Improvement in Cotton-Scrapers; and I do hereby declare that the following is a full, clear, and exact description of the construction and operation of the same, reference being had to the annexed drawings, forming part of this specification, in which—

Figure 1:
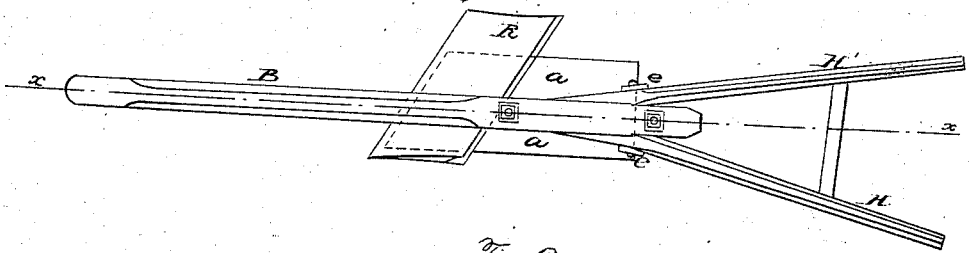
Figure 2:
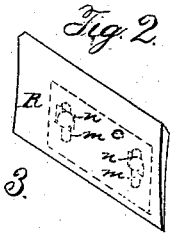
Figure 3:
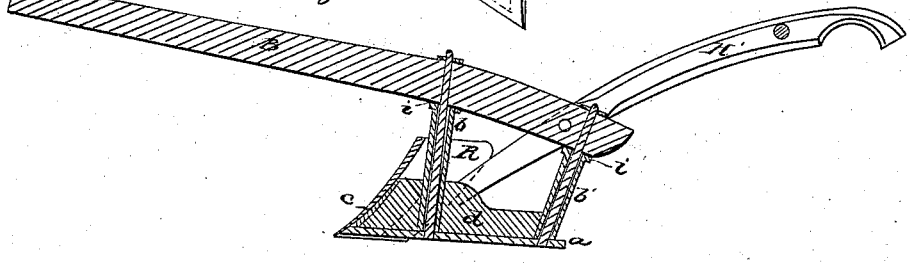
Figure 4:
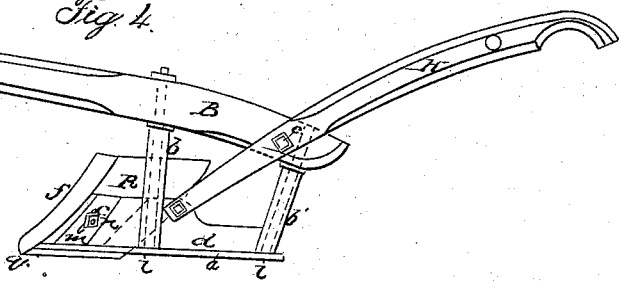

Figure 1 is a top view of the scraper. Fig. 2 is a front view of the mold-board. Fig. 3 is a vertical section on line $x\,x$ of Fig. 1. Fig. 4 is a side elevation of the scraper, looking to rear of mold-board.

Similar letters of reference in several figures denote the same parts of the scraper.

This invention, which in many respects resembles scrapers constructed in the usual manner, has for its object strength of construction and effectiveness of operation.

It consists of a flat ground-plate, $a$, having on its upper surface the hollow standards $b\,b'$ and oblique flange $c$, the standards and flange connected by the longitudinal brace $d$. The ground-plate, flange, standards, and brace are all cast in a single piece. The beam B is secured upon the tops of the standards $b\,b'$ by the bolts $i$ passing through the standards. The handles H H' are fastened at bottom to the brace $d$ by a bolt passing through both handles and brace, and at the beam by a bolt, $e$. The handle H is placed obliquely, so that the plowman will always be sufficiently far to the left to see the point of the mold-board R, which is of the form shown in Fig. 2, and is secured against the flange $c$ by bolts $n$, the slots $m$ in the flange serving to regulate the protrusion of the mold-board below the ground-plate. The cutting-edge $f$ of the mold-board has its lower corner, $q$, rounded, as shown in Fig. 4, to prevent the tearing of the young plants during the scraping operation.

The operation of my improved cotton-scraper is as follows: The general operation of the scraper does not differ materally from that of ordinary scrapers, but the heavy ground-plate gives a stiffness and solidity to the implement not possessed by others, preventing any irregular movement of the cutting-edge, which would be detrimental to the cotton-plants. The rounded corner of the mold-board prevents the tearing of the soil near the plants, and by skillful management permits the scraper to run close to the row, the oblique handle H admitting of the operator keeping his eye upon the cutting-edge and regulating its course. The solidity of construction will be readily understood by reference to the drawings, and will not here require particular notice.

I do not claim the mold-board, ground-plate, or any of the parts of my implement which are found in the cotton scraper patented by Wm. C. Finney, April 24, 1849; but What I do claim as my invention, and desire to secure by Letters Patent as an improvement on the above-named patent, is—

The hollow standards $b\,b'$, cast with the ground-plate, for firmly uniting the beam to the implement by means of bolts passing through said standards, as hereinbefore set forth.

In testimony whereof I have hereunto signed my name before two subscribing witnesses.

C. K. FARR.

Witnesses:
JOHN WATSON,
JOHN C. KELLY.